United States Patent
Román

(10) Patent No.: US 7,671,864 B2
(45) Date of Patent: Mar. 2, 2010

(54) FASTER IMAGE PROCESSING

(76) Inventor: Kendyl A. Román, 730 Bantry Ct., Sunnyvale, CA (US) 94087-3402

( * ) Notice: Subject to any disclaimer, the term of this patent is extended or adjusted under 35 U.S.C. 154(b) by 348 days.

(21) Appl. No.: 09/758,573

(22) Filed: Jan. 10, 2001

(65) Prior Publication Data

US 2002/0004860 A1   Jan. 10, 2002

Related U.S. Application Data

(60) Provisional application No. 60/176,346, filed on Jan. 14, 2000.

(51) Int. Cl.
G06F 13/00 (2006.01)
(52) U.S. Cl. .................. 345/537; 345/536; 345/538
(58) Field of Classification Search ......... 345/536–538, 345/501, 530, 558, 560, 557, 542; 710/22, 710/26; 711/118, 122, 119; 709/232
See application file for complete search history.

(56) References Cited

U.S. PATENT DOCUMENTS

| | | | |
|---|---|---|---|
| 4,301,469 A | 11/1981 | Modeen et al. | |
| 4,302,775 A | 11/1981 | Widergren et al. | |
| 4,385,363 A | 5/1983 | Widergren et al. | |
| 4,394,774 A | 7/1983 | Widergren et al. | |
| 4,410,916 A | 10/1983 | Pratt et al. | |
| 4,546,385 A | 10/1985 | Anastassiou | |
| 4,550,437 A * | 10/1985 | Kobayashi et al. | 345/536 |
| 4,646,356 A | 2/1987 | Anderson et al. | |
| 4,698,672 A | 10/1987 | Chen et al. | |
| 4,704,628 A | 11/1987 | Chen et al. | |
| 4,743,959 A | 5/1988 | Frederiksen | |
| 5,014,710 A | 5/1991 | Maslak et al. | |
| 5,046,027 A | 9/1991 | Taaffe et al. | |
| 5,047,853 A | 9/1991 | Hoffert et al. | |
| 5,271,072 A | 12/1993 | Yoshida et al. | 382/56 |
| 5,287,452 A * | 2/1994 | Newman | 345/520 |
| 5,309,232 A | 5/1994 | Hartung et al. | |
| 5,339,392 A | 8/1994 | Risberg et al. | |
| 5,416,602 A | 5/1995 | Inga et al. | |
| 5,471,989 A | 12/1995 | Roundhill et al. | |
| 5,552,832 A | 9/1996 | Astle | |
| 5,581,613 A | 12/1996 | Nagashima et al. | |

(Continued)

FOREIGN PATENT DOCUMENTS

WO   9959472 A1   11/1999

(Continued)

OTHER PUBLICATIONS

Office Action, mailed Jul. 11, 2002, for related U.S. Appl. No. 09/470,566.

(Continued)

*Primary Examiner*—Hau H Nguyen
(74) *Attorney, Agent, or Firm*—Schwabe, Williamson & Wyatt, P.C.

(57) ABSTRACT

Methods and machines which increase image processing performance by efficiently copying image data from input memory to main memory before performing CPU intensive operations, such as image enhancement, compression, or encryption, and by efficiently copying image data from main memory to output memory after performing CPU intensive operations, such as decryption, decompression, image enhancement, or reformatting.

21 Claims, 6 Drawing Sheets

U.S. PATENT DOCUMENTS

Figure 1A:
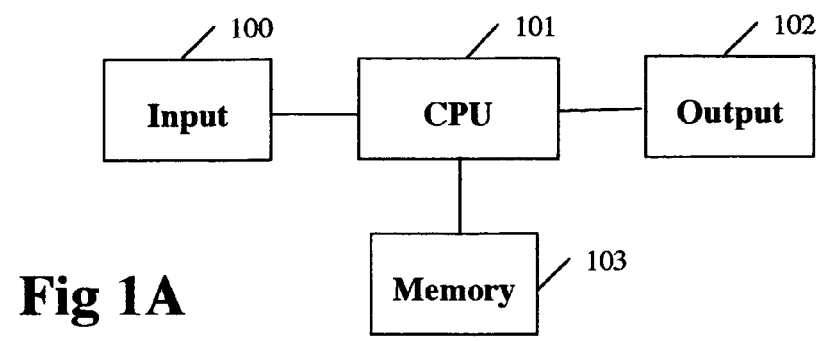

| | | | |
|---|---|---|---|
| 5,583,561 | A | 12/1996 | Baker et al. |
| 5,619,995 | A | 4/1997 | Lobodzinski |
| 5,621,660 | A | 4/1997 | Chaddha et al. |
| 5,646,618 | A | 7/1997 | Walsh |
| 5,684,968 | A * | 11/1997 | Flurry ........................ 715/806 |
| 5,696,940 | A * | 12/1997 | Liu et al. .................... 345/558 |
| 5,715,823 | A | 2/1998 | Wood et al. |
| 5,721,815 | A | 2/1998 | Ottesen et al. |
| 5,754,820 | A * | 5/1998 | Yamagami ................. 711/133 |
| 5,794,072 | A * | 8/1998 | Nomura et al. ............. 345/538 |
| 5,809,145 | A | 9/1998 | Silk et al. |
| 5,812,119 | A | 9/1998 | Tateyama |
| 5,812,788 | A | 9/1998 | Agarwal |
| 5,828,856 | A * | 10/1998 | Bowes et al. ................. 710/22 |
| 5,860,068 | A | 1/1999 | Cook |
| 5,882,206 | A | 3/1999 | Gillio |
| 5,897,498 | A | 4/1999 | Canfield, II et al. |
| 5,920,317 | A | 7/1999 | McDonald |
| 5,959,639 | A * | 9/1999 | Wada ......................... 345/542 |
| 5,966,728 | A * | 10/1999 | Amini et al. ................ 711/146 |
| 5,973,750 | A * | 10/1999 | Ogawa et al. .............. 348/570 |
| 5,999,655 | A | 12/1999 | Kalker et al. |
| 6,005,979 | A | 12/1999 | Chang et al. ................ 382/232 |
| 6,009,346 | A | 12/1999 | Ostrow |
| 6,018,713 | A | 1/2000 | Coli et al. |
| 6,025,854 | A * | 2/2000 | Hinz et al. .................. 345/538 |
| 6,054,990 | A | 4/2000 | Tran |
| 6,058,215 | A | 5/2000 | Schwartz et al. ............ 382/244 |
| 6,063,032 | A | 5/2000 | Grunwald |
| 6,064,324 | A | 5/2000 | Shimizu et al. |
| 6,078,691 | A | 6/2000 | Luttmer |
| 6,084,598 | A * | 7/2000 | Chekerylla ................. 345/441 |
| 6,091,777 | A | 7/2000 | Guetz et al. ................ 375/240 |
| 6,115,485 | A | 9/2000 | Dumoulin et al. |
| 6,144,392 | A * | 11/2000 | Rogers ....................... 345/537 |
| 6,181,711 | B1 | 1/2001 | Zhang et al. |
| 6,219,358 | B1 | 4/2001 | Pinder et al. |
| 6,230,241 | B1 * | 5/2001 | McKenney .................. 711/118 |
| 6,324,599 | B1 * | 11/2001 | Zhou et al. .................... 710/26 |
| 6,335,990 | B1 | 1/2002 | Chen et al. |
| 6,338,119 | B1 * | 1/2002 | Anderson et al. ............ 710/22 |
| 6,339,616 | B1 | 1/2002 | Kovalev |
| 6,384,862 | B1 | 5/2002 | Brusewitz et al. |
| 6,571,392 | B1 | 5/2003 | Zigmond et al. |
| 6,574,278 | B1 | 6/2003 | McVeigh et al. |
| 6,592,629 | B1 * | 7/2003 | Cullen et al. ................ 709/232 |
| 6,621,933 | B2 | 9/2003 | Chung et al. |
| 6,651,113 | B1 * | 11/2003 | Grimsrud ..................... 710/22 |
| 7,016,417 | B1 | 3/2006 | Roman et al. |
| 7,257,158 | B1 | 8/2007 | Figueredo et al. |
| 7,308,413 | B1 | 12/2007 | Tota et al. |
| 2007/0223574 | A1 | 9/2007 | Roman et al. |

FOREIGN PATENT DOCUMENTS

| | | | |
|---|---|---|---|
| WO | 0055791 | A1 | 9/2000 |

OTHER PUBLICATIONS

Final Office Action, mailed Mar. 26, 2003, for related U.S. Appl. No. 09/470,566.
Office Action, mailed Dec. 3, 2003, for related U.S. Appl. No. 09/470,566.
Final Office Action, mailed Jul. 14, 2004, for related U.S. Appl. No. 09/470,566.
Office Action, mailed Apr. 8, 2005, for related U.S. Appl. No. 09/470,566.
Notice of Allowability, mailed Aug. 10, 2005, for related U.S. Appl. No. 09/470,566.
Office Action, mailed Jan. 28, 2008, for related U.S. Appl. No. 11/280,656.
Notice of Allowability, mailed Mar. 5, 2009, for related U.S. Appl. No. 11/280,656.
Office Action, mailed Sep. 26, 2002, for related U.S. Appl. No. 09/467,721.
Final office Action, mailed Jan. 29, 2004, for related U.S. Appl. No. 09/467,721.
Office Action, mailed May 24, 2004, for related U.S. Appl. No. 09/467,721.
Office Action, mailed Apr. 20, 2005, for related U.S. Appl. No. 09/467,721.
Office Action, mailed Nov. 29, 2005, for related U.S. Appl. No. 09/467,721.
Notice of Allowability, mailed Aug. 22, 2006, for related U.S. Appl. No. 09/467,721.
Office Action, mailed Nov. 18, 2002, for related U.S. Appl. No. 09/473,190.
Office Action, mailed Dec. 11, 2003, for related U.S. Appl. No. 09/473,190.
Office Action, mailed Jun. 21, 2007, for related U.S. Appl. No. 09/473,190.
Office Action, mailed Jul. 7, 2009, for related U.S. Appl. No. 10/154,775.
Ziv et al.,"Compression of Individual Sequences via Variable-Rate Coding," Sep. 5, 1978, IEEE Transactions on Information Theory, vol. IT-24, No. 5, 7 pages.
Terry A. Welch, "A Technique for High-Performance Data Compression", Jun. 1984, 12 pages, Sperry Research Center, issue of IEEE Computer.
David A. Huffman, "A Method for Construction of Minimum Redundancy Codes", Published in 1952, 4 pages, Proceedings of the I.R.E.
Ziv et al., "A Universal Algorithm for Sequential Data Compression", May 1977, 7 pages, IEEE Transactions on Information Theory, vol. IT-23, No. 3.

* cited by examiner

FASTER IMAGE PROCESSING

This application claims benefit of 60/176,346. Jan. 14, 2000

BACKGROUND

1. Field of The Invention

This invention relates to image processing.

2. Related Technology

ANSI Standard C "memcpy" Function

A given computer hardware architecture will have an optimal means of copying a block of data from one location in a memory to another location. Complex Instruction Set Computing (CISC) architectures implement instructions that over a number of CPU cycles move a block of data. Reduced Instruction Set Computing (RISC) architectures optimize the instruction set to process each instruction in one or two CPU cycles but also included instructions that can be used to implement a short routine that will accomplish the block move in an optimal manner. An efficient routine for copying a block of data can be implemented for each specific computer architecture.

Some computer architectures include Direct Memory Access (DMA) circuitry that transfers data between memory and input/output (I/O) devices without continual central processing unit (CPU) intervention.

The ANSI standard for the C Programming Language defines a "memcpy" library function as an interface to an efficient routine for copying a block of bytes to another location.

Graphical Images

A television screen has a 4:3 aspect ratio. In the United States, television signals contain 525 scan lines of which 480 lines are visible on most televisions. When an analog video signal is digitized, each of the 480 lines are sampled 640 times, and each sample is represented by a number. Each sample point is called a picture element, or pixel. A two dimensional array is created that is 640 pixels wide and 480 pixels high. This 640×480 pixel array is a still graphical image that is considered to be full frame. The human eye can optimally perceive approximately 16.7 thousand colors. A pixel value comprised of 24 bits can represent each perceivable color. A graphical image made up of 24-bit pixels is considered to be full color. A standard Super VGA (SVGA) computer display has a screen resolution of 640 by 480 pixel. Twenty-four bits is three bytes. It is common to use a fourth byte for each pixel to specify a mask value or alpha channel. A typical image being processed may contain over 1.2 million bytes of data.

When digitizing a video signal, or when manipulating the graphics to be output as a video signal or to be displayed on a computer display it may be necessary to copy the image data to another area of memory (a buffer) for some type of image processing. However, the copied buffer takes up significant memory resources. Also the time it takes to copy the image can be significant especially when the image processing must be done in real time. Those skilled in the art realize that to improve processing performance the number of memory buffers containing a copy of the same data should be reduced to the minimum set possible.

Display Video RAM

The memory of a computer system may be physically implemented in different areas or on different boards. The main memory is used for storage of program instructions and data. A special memory area called "video RAM" may be dedicated to storing the image that is to be displayed on the computer display. The video RAM has special hardware that allows it to be accessed to update the display over 60 times a second.

Capture Video RAM

A video digitizer or video capture card may also contain a special memory area similar to display video RAM for capturing the digital samples from the video signal. This RAM may also have special hardware that allows it to be updated 60 times a second.

Cache Memory

Many computer architectures implement one or more levels of memory caching whereby blocks of memory data are stored in a cache memory that may be accessed more rapidly by the CPU. Typically input and output (I/O) memories such as video RAM, capture RAM, or hard disk buffers are not cached.

SUMMARY OF THE INVENTION

In accordance with the present invention, methods are provided of increasing performance of image processing by copying image data between I/O memory and main memory where CPU intensive processing of the image data is more efficiently performed Objects and Advantages Accordingly, beside the objects and advantages of the method described in the patent above, some additional objects and advantages of the present invention are:

(a) to provide efficient processing of image data prior to display on a computer display.
  (b) to provide efficient processing of image data being captured in real time with a video digitizer.
  (c) to reduce the time necessary to process the image data.

DRAWING FIGURES

In the drawings, closely related figures have the same number but different alphabetic suffixes.

Figure 1B:
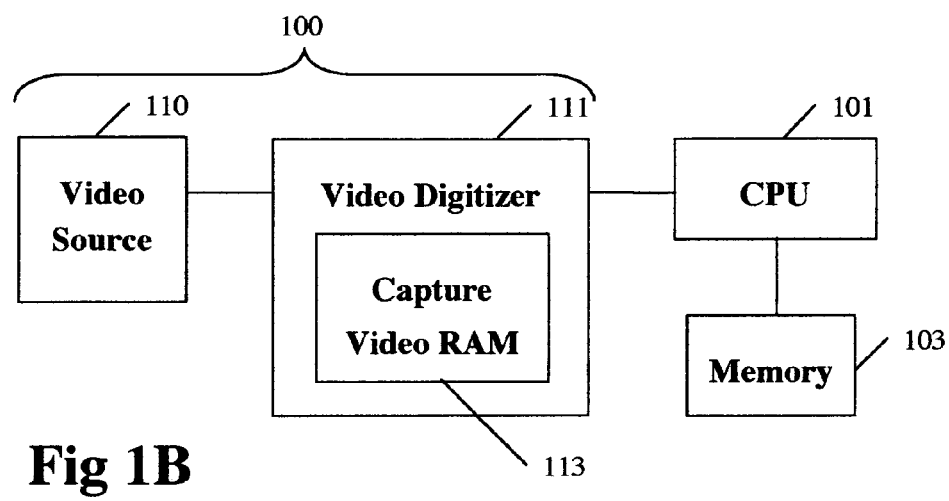
Figure 1C:
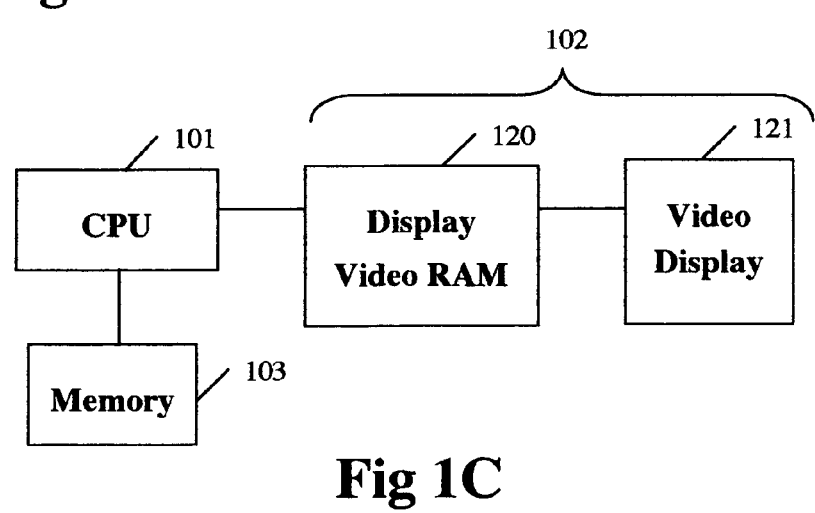
Figure 2A:
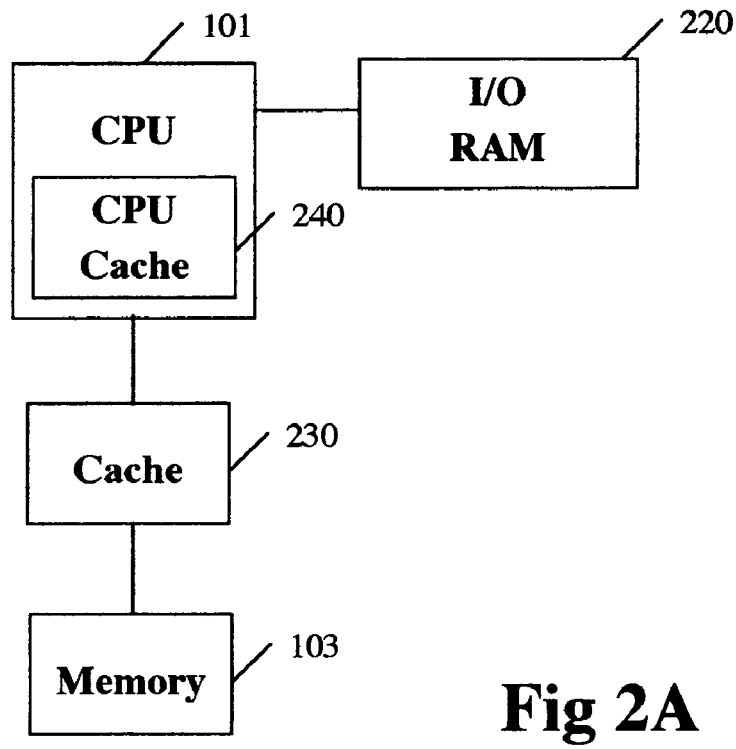
Figure 2B:
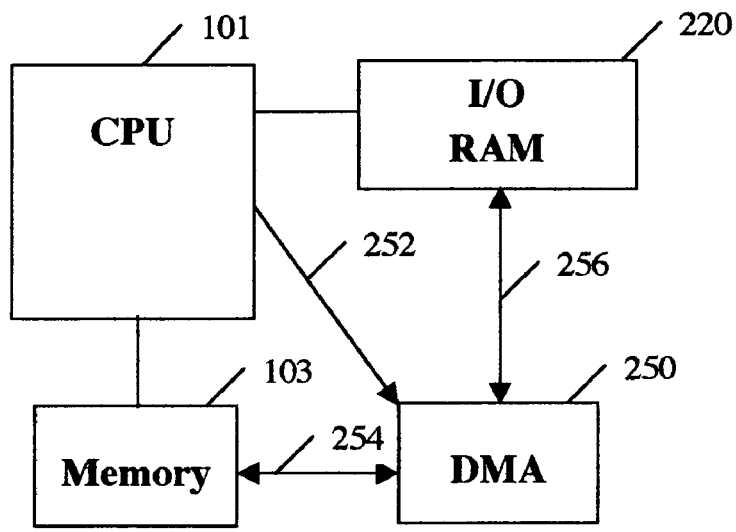
Figure 3A:
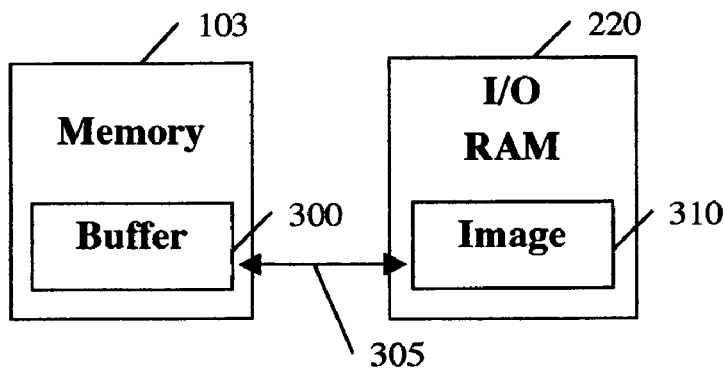
Figure 3B:
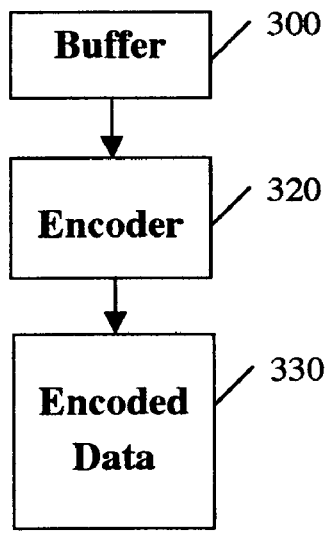
Figure 3C:
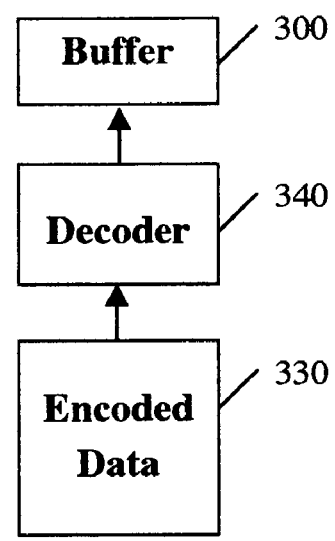
Figure 4:
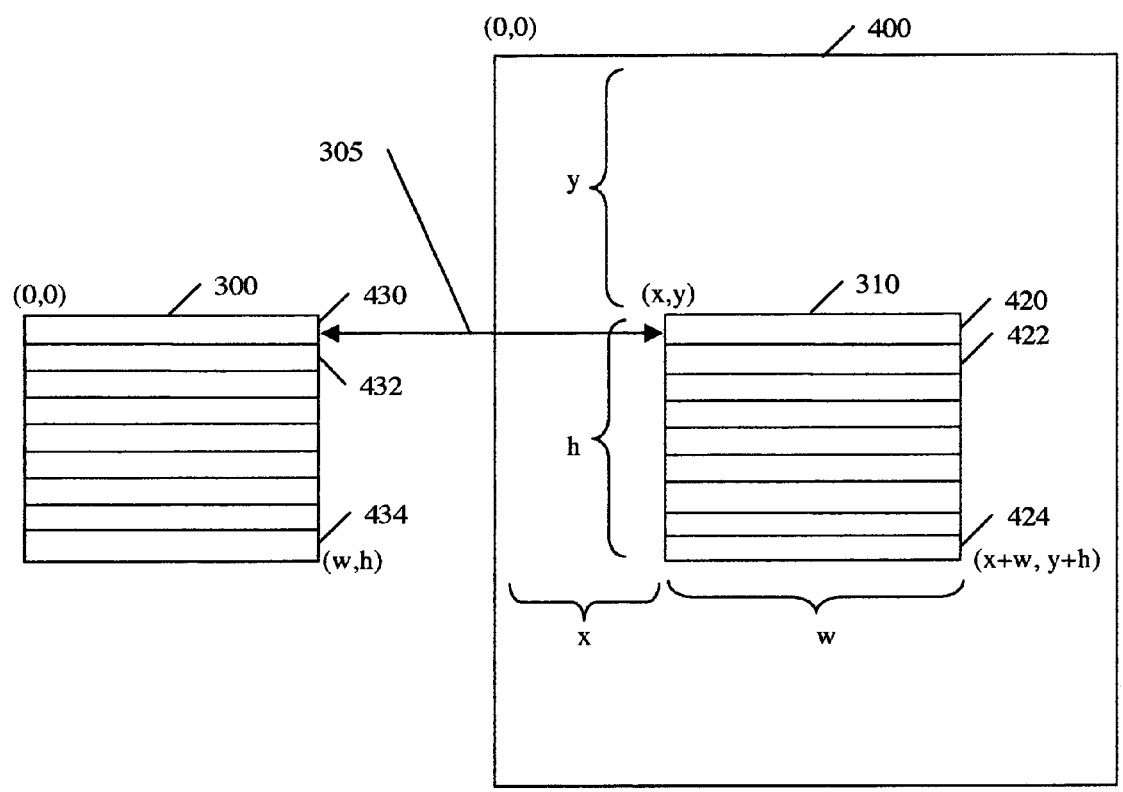
Figure 5:
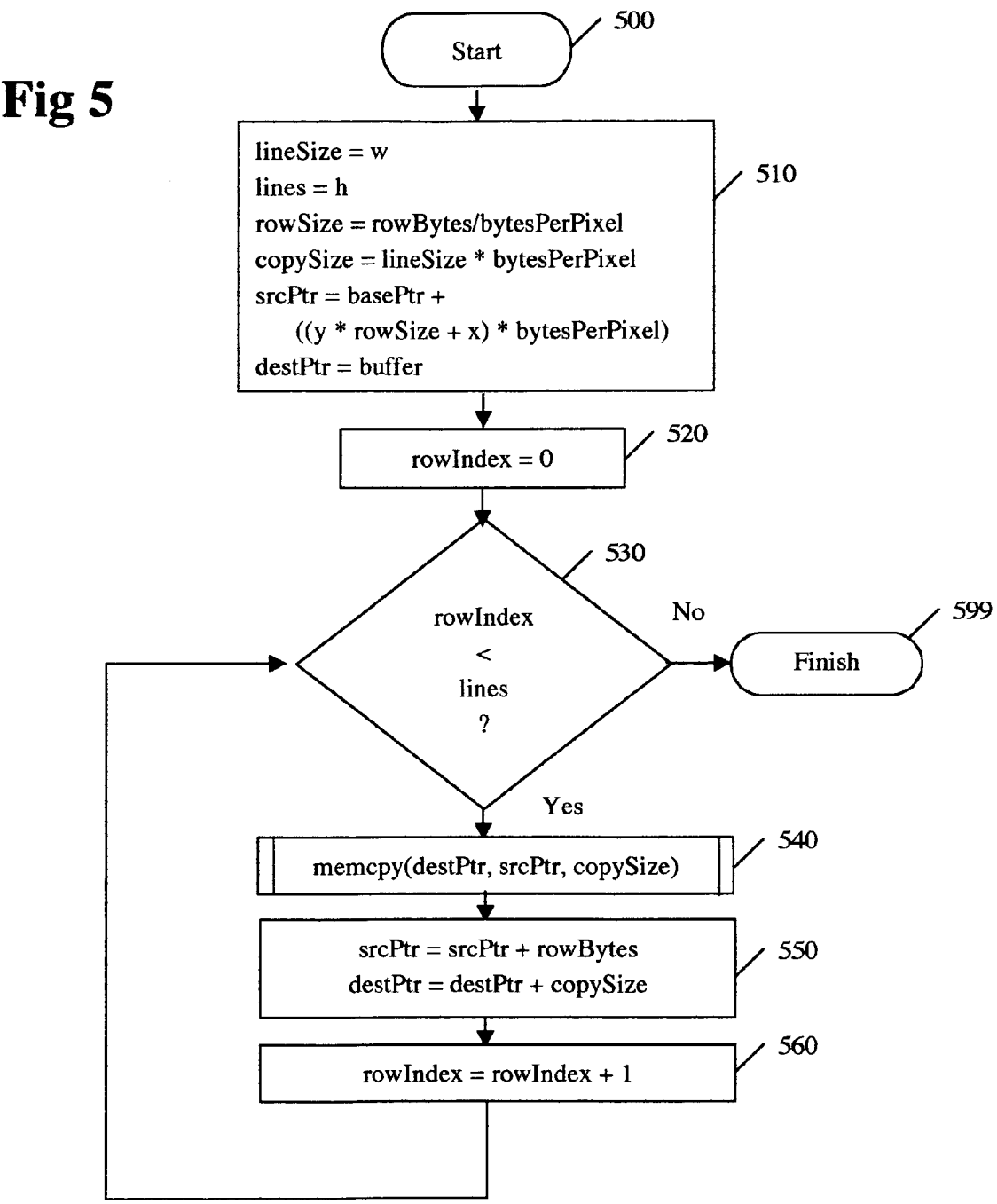
Figure 6:
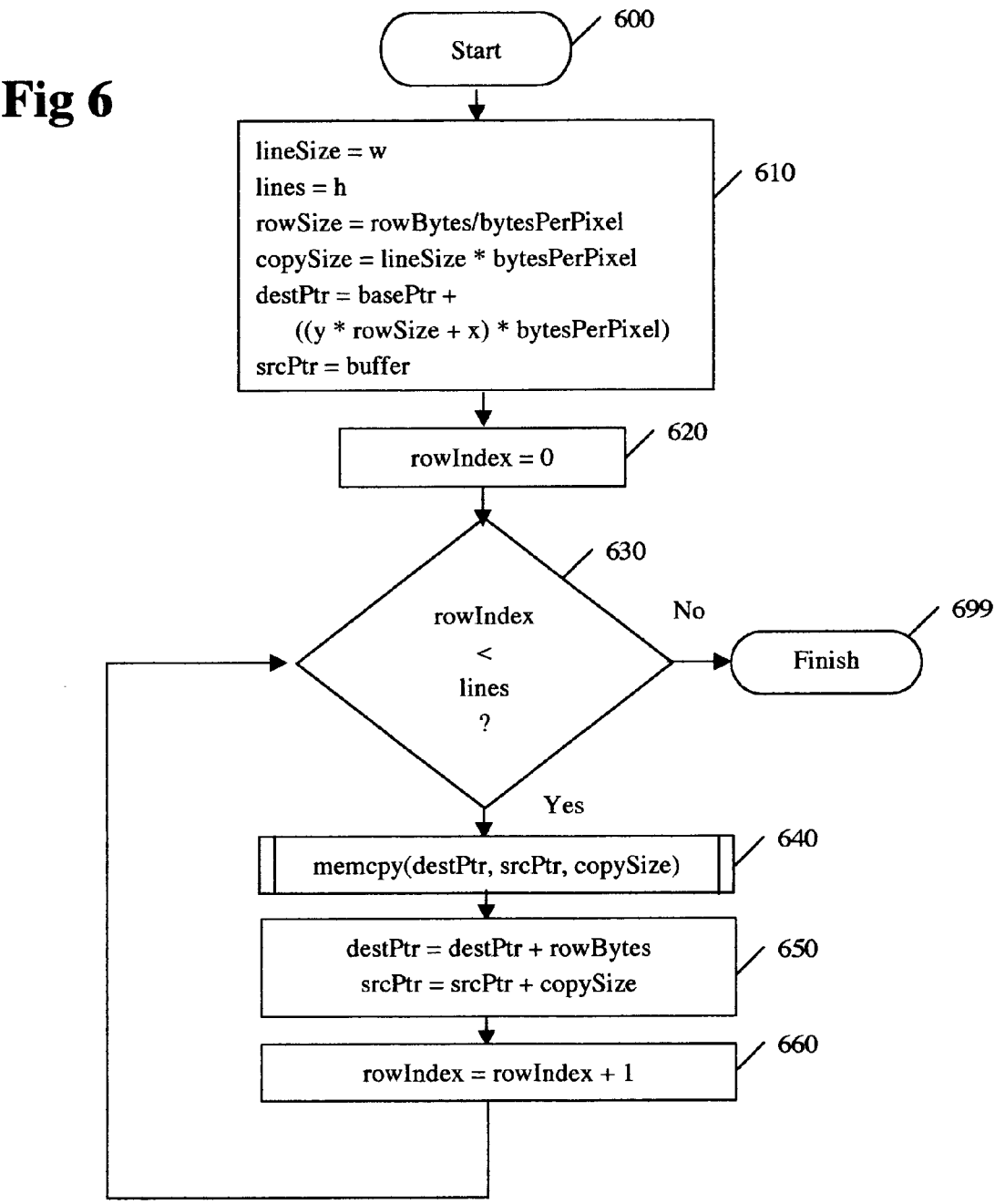

FIG. 1A shows a basic computer architecture.
  FIG. 1B shows components for video digitizing.
  FIG. 1C shows components for computer display.
  FIG. 2A shows a multi-level cache architecture.
  FIG. 2B shows a DMA architecture.
  FIG. 3A shows images copied between an I/O video RAM and main memory.
  FIG. 3B shows an input image being input and encoded.
  FIG. 3C shows encoded data being decoded and output.
  FIG. 4 shows row by row copy of a subset image.
  FIG. 5 shows a flowchart for copying a subset image from I/O RAM to a memory buffer.
  FIG. 6 shows a flowchart for copying a memory buffer to a subset image in I/O RAM.

| Reference Numerals in Drawings | | | |
|---|---|---|---|
| 100 | input | 101 | CPU |
| 102 | output | 103 | memory |
| 110 | video source | 111 | video digitizer |
| 113 | capture video RAM | 120 | display video RAM |
| 121 | video display | | |
| 220 | I/O RAM | 230 | cache |
| 240 | CPU cache | 250 | DMA circuitry |

-continued

Reference Numerals in Drawings

| 252 | DMA control | 254 | DMA-Memory bus |
|-----|-------------|-----|----------------|
| 256 | DMA-I/O bus | | |
| 300 | buffer | 305 | buffer-image copy |
| 310 | image | 320 | encoder |
| 330 | encoded data | 340 | decoder |
| 400 | super-image | 420 | first image line |
| 422 | second image line | 424 | last image line |
| 430 | first buffer line | 432 | second buffer line |
| 434 | last buffer line | | |
| w | image width | h | image height |
| x | image horizontal offset | y | image vertical offset |
| 500 | image copy start | 510 | image copy initialization step |
| 520 | set counter step | 530 | image copy done decision |
| 540 | image copy step | 550 | update pointers step |
| 560 | increment index step | 599 | image copy exit |
| 600 | buffer copy start | 610 | buffer copy initialization step |
| 620 | set counter step | 630 | buffer copy done decision |
| 640 | buffer copy step | 650 | update pointers step |
| 660 | increment index step | 699 | buffer copy exit |

DESCRIPTION OF THE INVENTION

FIG. 1A to 1C—Computer Architectures

FIG. 1A is a block diagram showing the basic components of a computer, comprising an input 100, a CPU 101, an output 102, and memory 103.

FIG. 1B shows an embodiment of the computer input 100 specialized to input video data. A video source 110 is connected to a video digitizer 111. The video digitizer 111 converts the analog video signal from the video source 110 to a digital format Some video digitizers transfer the video data to memory 103 for storage. Alternatively, some video digitizers contain capture video RAM 113 which can store the captured video data on the video digitizer 111 hardware without using memory 103 for storage.

FIG. 1C shows an embodiment of the computer output 102 specialized to output video data. A video display 121 (also knows as a computer monitor) displays graphical information based on data contained in a display video RAM 120. Programs running on the CPU 101 determine the contents of the display video RAM that is then shown by pixels on the video display 121.

FIGS. 2A and 2B—Caching and DMA

FIG. 2A is a block diagram showing computer architecture where there optionally are two levels of caches. The CPU 101 has an internal cache known as a CPU cache 240 that can store copies of recently accessed memory blocks that contain program instructions or data. A cache 230 stores copies of recently accessed blocks of memory data, because the cache 230 is outside the processor it is sometimes referred to as an external cache. In an architecture where the CPU has an internal CPU cache 240, the cache 230 may also be referred to as a level 2 cache.

If a copy of a block of memory data is in the CPU cache 240 or the memory cache 230, the CPU 101 can access it much faster than if the data has to be fetched from memory 103. If the data is not available to the CPU 101, the CPU 101 stalls causing there to be cycles where no useful processing is being done. The use of caches (230, 240) can have a significant impact of the speed of data processing.

It is common for input and output device registers and memories to be mapped into the memory address range. This is called memory mapped I/O. In a computer architecture that uses memory mapped I/O, the random access memory (RAM) associated with computer input 100 and output 102 devices can be accessed by programs running on the CPU as if they were memory 103 RAM. Because the I/O RAM 220 can be modified by its respective input 100 or output 102 device, special provisions are made so that the blocks of memory from I/O RAM 220 are not stored in the cache 230 or the CPU cache 240 (or if they are stored in the cache they are marked as invalid so that the CPU will fetch the current contents of the I/O RAM 220 rather than use the obsolete data in the cache). Examples of I/O RAM 220 include capture video RAM 113 and display video RAM 120.

FIG. 2B shows a computer architecture with direct memory access (DMA) circuitry 250. Without DMA circuitry 250, the CPU 101 must be involved in transferring data from memory 103 to I/O RAM 220. This CPU involvement takes the CPU 101 processing power away from executing other program instructions and adds overhead to handle the interruptions. DMA circuitry 250 is used to copy blocks of data directly between memory 103 and I/O RAM 220. A DMA operation is initiated by the CPU 101 with a DMA control 252 sent from the CPU 103 to the DMA circuitry 250. Once the DMA operation is initiated the CPU can return to other work. The DMA circuitry moves the data from memory 103 to I/O RAM 220 along the DMA-memory bus 254 and DMA-I/O bus 256 or from I/O RAM 220 to memory 103. In practice, the DMA circuitry may become a secondary bus master of a system bus that interconnects the CPU 101, I/O RAM 220, and memory 103. Once the data transfer is complete the DMA circuitry 250 notifies the CPU.

Processing Speed Improvement—FIG. 3A to 3C

When video data is being displayed or captured the storage (memory 103 or I/O RAM 220) holding the data is continually being accessed by the video display circuitry or video digitizing circuitry. Also the capture video RAM 113 and the display video RAM 120 typically is not cached by a CPU 101 in any cache (230 or 240), so when processing the video data for compression, encryption, enhancement, or decompression it is significantly faster to process the data in cacheable main memory.

The present invention uses a memory copy function (similar to a memcpy function or a substantially similar set of computer instructions) to copy the desired image data from an I/O RAM 220 to a cacheable main memory 103 (FIG. 2A) where it can be more efficiently processed. After the processing is done, the processed image is then copied back to the display video RAM 120 for display on the video display 121 (FIG. 1C).

FIG. 3A shows a buffer 300 in memory 103 and an image 310 stored in I/O RAM 220. The buffer-image copy 305 of data between the buffer 300 and the image 310 is shown as bi-directional arrows. Once the image data is copied from the image 310 to the memory buffer 300 it can be much more efficiently processed by the CPU 103. FIG. 3B shows an encoder 320 program which accesses the buffer 300 applying enhancement, compression, or encryption algorithms as needed to produce encoded data 330. The encoded data 330 can be stored on a storage device or transferred over a network to another computer. FIG. 3C shows a decoder 340 program processing the encoded data 330 into another instance of a memory buffer 300. The decoder can decrypt, decompress, or enhance the encoded data as needed and place the resulting data in a memory buffer 300.

This invention discovered that is was much more efficient to write the decoded data to a memory buffer 300 instead of writing it directly to image 310 in I/O RAM 220 as each pixel is processed. Once the decoder processing is complete, the buffer-image copy 305 is used to transfer the data from the buffer 300 to the I/O RAM 220. The I/O RAM could be a display video RAM 120 as shown in FIG. 1C.

Not Obvious

The speed improvement yielded by this invention was not obvious to one skilled in the art of computer programming. The video data is large, up to 1.2 million bytes, and the time to copy it from one buffer to another generally is thought to be overhead that will decrease performance. This invention teaches that because of hardware lockout, collisions with the video circuitry, the lack of data caching in the CPU cache 240 or memory cache 230, or other factors, the extra copy can significantly reduce the processing time, and thus reduce the overall time required to process the data and to display or capture the video data.

The memory copy routine used in the buffer-image copy 305 may use processor specific code, or other methods, to move blocks of data between the memory 103 (or the caches (230,240)) and the I/O RAM 220.

The methods of this invention are much more efficient (due to I/O RAM lockouts and conflicts) than processing each pixel a byte or word at a time in place in I/O RAM 220.

Alternatively, DMA circuitry 250 (FIG. 2B) may be used to increase the speed of transfer between memory 103 and the I/O RAM 220.

In one embodiment of this invention the entire image is copied by a single call to the memcpy function. This has the advantage of only making one function call.

FIG. 4—Preferred Embodiment

In the preferred embodiment, only a subset image 310 of the data in I/O RAM 220 is of interest for processing, so the memory copy function is called repeatedly to copy each line of desired image data. For example if the desired subset is 320 by 240, the memory copy function is called 240 times and copies 320 pixels each time. This has the advantage of only copying the desired data. Even though there is more overhead in determining how to copy the subset and in calling the memory copy function multiple time, the time saved by copying less data more than compensates for the additional overhead. Less memory is used to hold the main memory buffer and less data must be processed.

FIG. 4 is a diagram of the buffer 300 and the image 310 that shows more detail than FIG. 3A. The subset image 310 is contained within a super-image 400. When a television video signal is digitized there are portions of the signal that are not visible on most television displays. The video digitizer often will process all of the video signal producing a super-image 400 that contains data that surrounds the subset image 310 and the surround data typically is of no interest. If the origin of the super-image 400 is (0, 0) the image 310 of interest can be found at a coordinate (x, y) composed of the image horizontal offset x and the image vertical offset y. The image width w and the image height can be used to allocate the memory buffer 300, rather than copying the entire super-image 400. The coordinate of the last pixel of the desired image is (x+w, y+h).

In the preferred embodiment, the first image line 420 (starting at (x,y)) is copied (305) to the first buffer line 430 for the length of the image width w. Next the second image line 422 is copied to the second buffer line 432. Each line is copied until the last image line 424 is copied to the last buffer line 434. After the desired data is copied in this manner the buffer 300 can be efficiently processed. Buffer 300 is smaller than the super-image 400 and the data of interest is contiguous so it can be processed more efficiently. Buffer 300 can be cached and will have typically no conflict from other accesses.

FIG. 4 also illustrates the reverse process of copying a buffer 300 containing processed data to a super image 400 in an I/O RAM 220 (FIG. 3A). Each line of the buffer 300 is copied (305) to the image 310 in the super image 400 at the desired offset (x,y). In this reverse process the first buffer line 430 is copied to the first image line 420. The second buffer line 432 is copied to the second image line 420, and so forth, until the last buffer line 434 is copied to the last image line 424. The same advantages of buffer 300 being smaller, contiguous, cacheable, and conflict free also apply to the reverse process.

FIG. 5—Image Copy Flowchart

FIG. 5 is a flow chart for the method of copying the image 310 to buffer 300 as shown in FIG. 4. The method starts at an image copy start 500 entry point. Next an image copy initialization step 510 comprising the following is executed:
the line size is set to the image width w.
the number of lines is set to the image height h.
the row size is calculated by dividing the total bytes in a row of the super image by the number of bytes per pixel.
the copy size is calculated by multiplying the line size by the number of bytes per pixel.
the source pointer is set the base address of the image 400 plus the calculation of the number of bytes to get to the (x,y) offset: ((y * row size+x) * bytes per pixel).
the destination pointer is set to the base address of the buffer 300.

Next, in a set counter step 520, the row index is set to 0. An image copy done decision 530 is made by comparing the row index to the number of lines. If one or more lines still need to be copied, flow continues to an image copy step 540. In the image copy step 540, the memory copy function is called to copy copy-size bytes from the current source pointer to the current destination pointer (effectively copying a line of the image 310 to the buffer 300). Next, in an update pointers step 550, the source pointer is incremented by the number of bytes in a row of the super image (effectively addressing the beginning of the next line of the image 310), and the destination pointer is incremented by the number of bytes in a line of the buffer 300 (effectively addressing the beginning of the next line of the buffer 300). Next in an increment index step 560, the row index is increment. Flow continues to the image copy done decision 530, and the loop continues until each line of the image 310 is copied. When the image has been fully copied, flow terminates at an image copy exit 599 point.

FIG. 6—Buffer Copy Flowchart

FIG. 6 is a flow chart for the method of copying the buffer 300 to the image 310 as shown in FIG. 4. The method starts at a buffer copy start 600 entry point. Next a buffer copy initialization step 610 comprising the following is executed:
the line size is set to the image width w.
the number of lines is set to the image height h.
the row size is calculated by dividing the total bytes in a row of the super image by the number of bytes per pixel.
the copy size is calculated by multiplying the line size by the number of bytes per pixel.
the destination pointer is set the base address of the image 400 plus the calculation of the number of bytes to get to the (x,y) offset: ((y * row size+x) * bytes per pixel).
the source pointer is set to the base address of the buffer 300.

Next, in a set counter step 620, the row index is set to 0. A buffer copy done decision 630 is made by comparing the row index to the number of lines. If one or more lines still need to be copied, flow continues to a buffer copy step 640. In the buffer copy step 640, the memory copy function is called to copy copy-size bytes from the current source pointer to the current destination pointer (effectively copying a line of the buffer 300 to the image 310). Next in an update pointers step 650, the destination pointer is incremented by the number of bytes in a row of the super image (effectively addressing the beginning of the next line of the image 310), and the source pointer is incremented by the number of bytes in a line of the buffer 300 (effectively addressing the beginning of the next line of the buffer 300). Next in an increment index step 660, the row index is increment. Flow continues to the buffer copy done decision 630, and the loop continues until each line of the buffer 300 is copied. When the buffer has been fully copied, flow terminates at a buffer copy exit 699 point.

Advantages

Execution Speed

The methods of the present invention provide a decrease in the processing time required to process images that are being input or output. This decrease in processing time allows for video images to be enhanced, compressed, and encrypted in real time. The time saved by these methods can be used to execute more efficient compression algorithms that may in turn reduce the bandwidth required to transfer the encoded data between computers or may reduce the space needed to store the encoded data.

Reduced Memory Requirements

The selection of a subset image 310 from a super image 400 (FIG. 4) reduces the amount of memory needed to hold the data being processed.

Conclusion, Ramification, and Scope

Accordingly, the reader will see that the methods the present invention provides a means of reducing the processing time and computer resources needed to process images being input or output.

Furthermore, the present invention has additional advantages in that it provides a means for reducing the space required in a storage medium.

Although the descriptions above contain many specifics, these should not be construed as limiting the scope of the invention but as merely providing illustrations of some of the preferred embodiments of this invention. For example, the memory copy algorithm can be implemented in a number of ways without limiting the scope of this invention to the use of a particular implementation.

Thus the scope of the invention should be determined by the appended claims and their legal equivalents, and not solely by the examples given.

I claim:

1. A method of increasing image processing performance, comprising:
    copying image data of a selected subset of an entire image existing in an I/O RAM into a copy of the selected subset in a buffer in a main memory by multiple calls to a memory copy function copying each image line of the selected subset to a buffer line of the buffer;
    performing CPU intensive operations on the copy selected subset in the main memory and not on the image data in said I/O RAM to generate a processed image and storing the processed image in the buffer; and
    copying the processed image from the buffer in the main memory to the I/O RAM by multiple calls to the memory copy function copying each buffer line of the buffer to an image line to generate a copy of the processed image in the I/O RAM.

2. The method of claim 1 wherein said main memory is cached.

3. The method of claim 1 wherein said main memory is cached in a CPU cache.

4. The method of claim 1 wherein said main memory is cached in an external cache.

5. The method of claim 1 wherein said copying of a selected subset of the entire image and the processed image in the I/O RAM comprises copying using DMA circuitry.

6. The method of claim 1 wherein said I/O RAM is a display video RAM associated with a video output device configured to display the copy of the processed image.

7. The method of claim 1 wherein the CPU intensive operations enhancing or reformatting the image data of the copy of the selected subset to generate the processed image.

8. The method of claim 1 wherein the main memory includes cache memory to store the copy of selected subset and the processed image.

9. The method of claim 8 wherein the entire image includes a television video image including a visible portion visible on a display device and a non-visible portion not visible on the display device and the selected subset of the entire image substantially includes only the visible portion.

10. A machine for image processing comprising:
    an I/O device including an I/O RAM for storing an entire image;
    a buffer of a main memory for storing a copy of a selected subset of the entire image;
    means for copying the selected subset of the entire image from the I/O RAM to the main memory to generate the copy of the selected subset by multiple calls to a memory copy function to copy each image line of the selected subset to a buffer line of the buffer;
    a processor for performing computing intensive processing on the copy of the selected subset to generate a processed image and to store the processed image in the buffer; and
    means for copying the processed image from said main memory to the I/O RAM to generate a copy of the processed image in the display video RAM by multiple calls to the memory copy function to copy each buffer line of the buffer to an image line in the I/O RAM.

11. The machine of claim 10 wherein said I/O RAM is a capture video RAM.

12. The machine of claim 10 wherein said I/O device is a means for outputting an image.

13. The machine of claim 10 wherein said processor is configured to execute programs to enhance or reformat the copy of the selected subset to generate the processed image.

14. The machine of claim 10 wherein the main memory includes cache memory to store the copy of selected subset and the processed image.

15. The machine of claim 14 wherein the entire image includes a television video image including a visible portion visible on a display device and a non-visible portion not visible on the display device and the selected subset of the entire image substantially includes only the visible portion.

16. A machine for image processing comprising:
    an image input device configured to capture an entire image and including a capture video RAM to store the entire image;
    a buffer in a main memory to store a copy of the selected subset of the entire image;
    means for copying the selected subset from the capture video RAM to the buffer to generate the copy of the selected subset by multiple calls to a memory copy function to copy each image line of the selected subset to a buffer line of the buffer;

a processor coupled to the main memory and configured to perform an encoding operation on the copy of the selected image to generated an encoded image for storage and thereafter to decode another instance of the encoded image to generate a processed image and to store the processed image in the main memory;

an output device including a display video RAM; and means for copying the processed image from the main memory to a copy of the processed image in the display video RAM.

17. The machine of claim 16 wherein said processor is configured to move the encoded image to a storage device from the buffer and thereafter to move the another instance of the encoded image from the storage device to the main memory.

18. The machine of claim 16 wherein image data of the encoded image is a selected one of compressed data, encrypted data, or enhanced data.

19. The machine of claim 17 wherein image data of the processed image is a selected one of decompressed data, decrypted data, or enhanced data.

20. The machine of claim 16 wherein the main memory includes cache memory to store the copy of selected subset and the processed image.

21. The machine of claim 20 wherein the entire image includes a television video image including a visible portion visible on a display device and a non-visible portion not visible on the display device and the selected subset of the entire image substantially includes only the visible portion.

* * * * *